United States Patent
Diez et al.

(10) Patent No.: US 7,525,067 B2
(45) Date of Patent: Apr. 28, 2009

(54) DUAL WIRE WELDING TORCH AND METHOD

(75) Inventors: Fernando Martinez Diez, Peoria, IL (US); Kevin S. Stump, Sherman, IL (US); Howard W. Ludewig, Groveland, IL (US); Alan L. Kilty, Peoria, IL (US); Matthew M. Robinson, Peoria, IL (US); Keith M. Egland, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/449,054

(22) Filed: Jun. 8, 2006

(65) Prior Publication Data

US 2007/0284351 A1 Dec. 13, 2007

(51) Int. Cl.
*B23K 9/00* (2006.01)
(52) U.S. Cl. .............................. 219/137 R; 219/137.2
(58) Field of Classification Search ............ 219/137 R, 219/137.2, 74, 130.1, 137 PS
See application file for complete search history.

(56) References Cited

U.S. PATENT DOCUMENTS

| 4,320,277 | A | * | 3/1982 | Taira et al. ................ 219/61 |
| 5,149,939 | A | | 9/1992 | Imaizumi et al. |
| 5,155,330 | A | * | 10/1992 | Fratiello et al. ......... 219/137 R |
| 5,714,735 | A | | 2/1998 | Offer |
| 6,172,333 | B1 | * | 1/2001 | Stava ..................... 219/137 PS |
| 6,683,279 | B1 | | 1/2004 | Moerke |
| 7,115,324 | B1 | * | 10/2006 | Stol et al. ................... 428/594 |

OTHER PUBLICATIONS

Lassaline, Zajaczkowski, and North; "Narrow Groove Twin-Wire GMAW of High-Strength Steel"; Welding Journal, Sep. 1989; pp. 53-58.*
Hedegard, Anderson, Tolf, Weman and Lundin; Enhanced Prospects For Tandem-MIG/MAG Welding; published prior to Sep. 16, 2004; pp. 1-10; Sweden.
Lassaline, Zajaczkowski, and North; Narrow Groove Twin-Wire GMAW of High-Strength Steel; published prior to Sep. 1, 1989; pp. 53-58; United States.
Ogawa, Asai, and Tsuboi; Development Of Narrow Gap Tandem GMAW Process; published prior to Sep. 16, 2004; pp. 1-8.
Kang and S.J. Na; Characteristics Of Welding And Arc Signal In Narrow Groove Gas Metal Arc Welding Using Electromagnetic Arc Oscillation; Supplement To The Welding Journal; May 2003; 93-S-99-S.
Nomura and Sugitani; Narrow Gap MIG Welding Process With High Speed Rotating Arc; The International Conference on Quality and Reliability in Welding; Sep. 1984; pp. #D-14-1-D-14-6; Hangehou, China.

* cited by examiner

*Primary Examiner*—Kevin P Kerns
(74) *Attorney, Agent, or Firm*—Liell & McNeil

(57) ABSTRACT

A welding torch includes a nozzle with a first welding wire guide configured to orient a first welding wire in a first welding wire orientation, and a second welding wire guide configured to orient a second welding wire in a second welding wire orientation that is non-coplanar and divergent with respect to the first welding wire orientation. A method of welding includes moving a welding torch with respect to a workpiece joint to be welded. During moving the welding torch, a first welding wire is fed through a first welding wire guide defining a first welding wire orientation and a second welding wire is fed through a second welding wire guide defining a second welding wire orientation that is divergent and non-coplanar with respect to the first welding wire orientation.

20 Claims, 3 Drawing Sheets

DUAL WIRE WELDING TORCH AND METHOD

This invention was made with Government support under DOE Contract No. DE-FC36-031D14462 awarded by the U.S. Department of Energy. The Government has certain rights to this invention.

TECHNICAL FIELD

The present disclosure relates generally to arc wire welding apparatuses and related methods, and relates more particularly to a dual wire welding apparatus and method wherein first and second welding wires are oriented in a non-coplanar and divergent relationship relative to one another during welding a joint.

BACKGROUND

Welding has long been used in manufacturing, construction and related fields as a method of creating, strengthening and repairing connections between and among components, structural or decorative panels, beams, etc. The widespread use and many variant applications of welding technology have led to the development of a wide variety of welding strategies and types of equipment over the years. In general terms, welding, in contrast to certain other joining techniques, involves melting adjacent areas to be joined, then allowing the resultant molten pool of material to re-solidify and thereby form a metallurgical bond between the areas.

One common type of welding is known as electrical arc welding, which typically utilizes a welding "torch" having one or more electrical wires from which an electrical arc is generated, passing between the tips of the wires and regions of the workpiece(s) sought to be joined. The electrical arc generates intense heat which melts portions of the electrical wire and the workpiece, forming a molten material pool which can re-solidify to form the desired joint.

One attempt at improving the efficiency and reliability of electrical arc welding is through the use of multiple welding wires in a single welding torch. Multiple welding wires extending from a welding torch end or nozzle can in some cases allow a welding technician or robot to weld adjacent sides or edges of a joint in a single pass, rather than requiring separate passes to weld material at each side or "root" of the joint. The multiple welding wires also tend to generate a relatively larger molten pool of material and higher welding deposition rate as compared to the use of a single welding wire.

While the use of multiple welding wires in a single welding torch, often termed a "tandem" welding torch, has been relatively successful, there is always room for improvement. In particular, it can be difficult to position the welding wire tips in optimum locations for welding in certain types of joints. In the case of joints between relatively thick pieces of material, it is often necessary to prepare the joint prior to welding such that the welding wire tips can be maneuvered to positions relatively close to the roots. Positioning the welding wire tips at an optimum position close to the roots has been shown to increase productivity and weld quality, as well as requiring relatively less energy to weld given the relatively shorter necessary arc length. While various strategies are known which are directed to enabling better maneuverability of welding wires toward optimum welding positions, engineers have continued to struggle to develop robust tandem welding torch designs without sacrificing weld quality in production.

One common joint type that tends to require relatively onerous preparation prior to welding is known as a butt joint. Butt joints typically include adjacent peripheral edges of workpiece members positioned generally in parallel. In other words, in a typical butt joint the peripheral edges of the workpieces are generally aligned with one another edge to edge. The workpiece members may be panels, beams, pipes, etc., and are typically separated by a gap to allow the wires of the welding torch to be positioned as close to the joint roots as practicable. A backing plate may be positioned to extend across the gap such that a channel exists, defined by the backing plate and the facing edges of the work piece members. During welding, the wires are moved within the channel.

It has long been considered challenging to optimally maneuver the welding wires along the roots of a butt joint with a traditional welding torch to weld a satisfactory joint. Aberrations in the uniformity of a welded joint can lead to cracks, that may begin from voids adjacent roots that never melted during the first pass of the welding procedure. Poorly welded joints can ultimately require expensive and time-consuming repairs. In an attempt to improve welded joint integrity, adjacent workpiece members to be joined via welding are typically either spaced relatively far apart, still tending to lessen the end integrity of the joint, or the workpieces are specially prepared, such as by including a torch access bevel on the tops of aligned workpiece edges, prior to welding, to facilitate positioning and maneuvering of the welding wires.

Where dual wire welding torches are used, the electrical arcs can generate magnetic fields which cause the welding wires to move out of a desired position within the joint, resulting in sub-optimal or irregular fusion of the backing plate and workpiece members and reduced overall soundness of the joint. This phenomenon is particularly acute where relatively longer welding wires are used. While certain welding torches address these concerns to some extent, for example via spinning the welding wires while feeding or via magnetically and/or mechanically oscillating the electrical arcs to assist in orienting the welding wires as desired, such torches tend to be rather unwieldy and difficult to precisely maneuver, or are fragile and ill-suited to production environments.

As alluded to above, special preparations are sometimes made prior to welding in an attempt to improve joint integrity and production efficiency. To this end, the workpiece members of a butt joint are often beveled via machining such that they have a cross section giving sufficient room for the welding torch and its associated welding wires to be maneuvered to the roots of the joint. It will be readily apparent that a separate machining step prior to welding a butt joint, or for that matter, any other joint, is time consuming, expensive, and wastes material.

U.S. Pat. No. 6,172,333 to Stava is directed to one type of welding apparatus configured with dual welding wires for welding a gap between adjacent pipe sections. In Stava, the respective welding wires are moved in union on opposite sides of the gap. As in other known designs, in Stava the workpiece sections defining the gap are beveled to permit desired positioning of the welding wires. Stava further proposes an adjustment feature for adjusting the spacing of the wires, purportedly to accommodate different sized gaps. While Stava may have certain advantages over other known designs, the strategy still requires painstaking joint preparation prior to welding, for at least certain types of joints.

SUMMARY OF THE DISCLOSURE

In one aspect, the present disclosure provides a method of welding that includes moving a welding torch with respect to a work piece joint to be welded. The method further includes, during moving the welding torch, feeding a first welding wire through a first welding wire guide defining a first welding wire orientation, and feeding a second welding wire through a second welding wire guide defining a second welding wire orientation that is divergent and non-coplanar with respect to the first welding wire orientation.

In another aspect, the present disclosure provides a nozzle end for a welding torch assembly. The nozzle end includes a nozzle end body, a first welding wire guide coupled to the nozzle end body and having an orientation, and a second welding wire guide coupled to the nozzle end body and having a different orientation. The first and second welding wire guides each include a proximal end coupled to the nozzle end body, and a distal end. The first and second welding wire guides further define a first plane intersecting the distal ends of the first and second wire guides, and a second plane intersecting each of the proximal ends and oriented transverse to the first plane. The orientations of the respective first and second welding wire guides are non-coplanar and diverge in different directions with respect to the second plane.

In still another aspect, the present disclosure provides a welding torch that includes a nozzle having a first welding wire guide configured to orient a first welding wire in a first welding wire orientation. The nozzle further includes a second welding wire guide configured to orient a second welding wire in a second welding wire orientation that is non-coplanar and divergent with respect to the first welding wire orientation.

DETAILED DESCRIPTION

Figure 1:
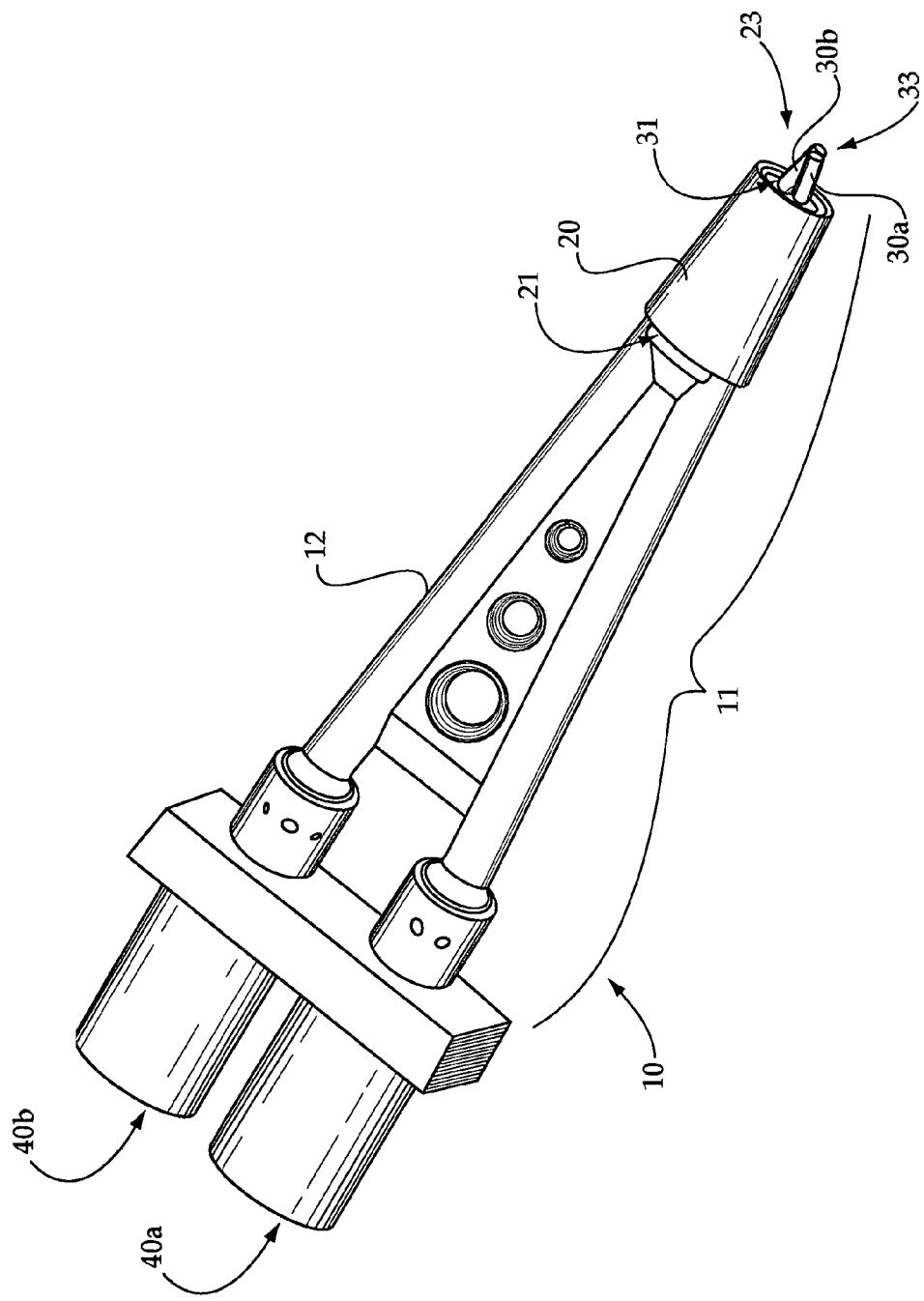
FIG. 1 is a perspective view of a portion of a welding torch assembly according to one embodiment.

Referring to FIG. 1, there is shown a welding torch 10 according to the present disclosure. Welding torch 10 includes a nozzle 11 having a welding wire feeding portion 12 and a nozzle end body 20 mounted thereon, nozzle end body 20 having a wire feed side 21 and a welding side 23. Welding torch 10 comprises a dual wire welding torch whereby first and second welding wires may be directed in desired orientations from nozzle end body 20, as described herein. Welding wires may be fed into welding wire receiving portions 40a and 40b of torch 10 from conventional wire spools or the like (not shown), through welding wire feeding portion 12, into nozzle end body 20 and out of first and second welding wire guides 30a and 30b. First and second welding wire guides 30a and 30b may each have a proximal end 31 coupled to nozzle end body 20, and an opposite distal end 33. Wire guides 30a and 30b may further be configured to orient the subject welding wires in non-coplanar and divergent welding wire orientations relative to one another to facilitate certain types of welding, as described herein.

Figure 2:
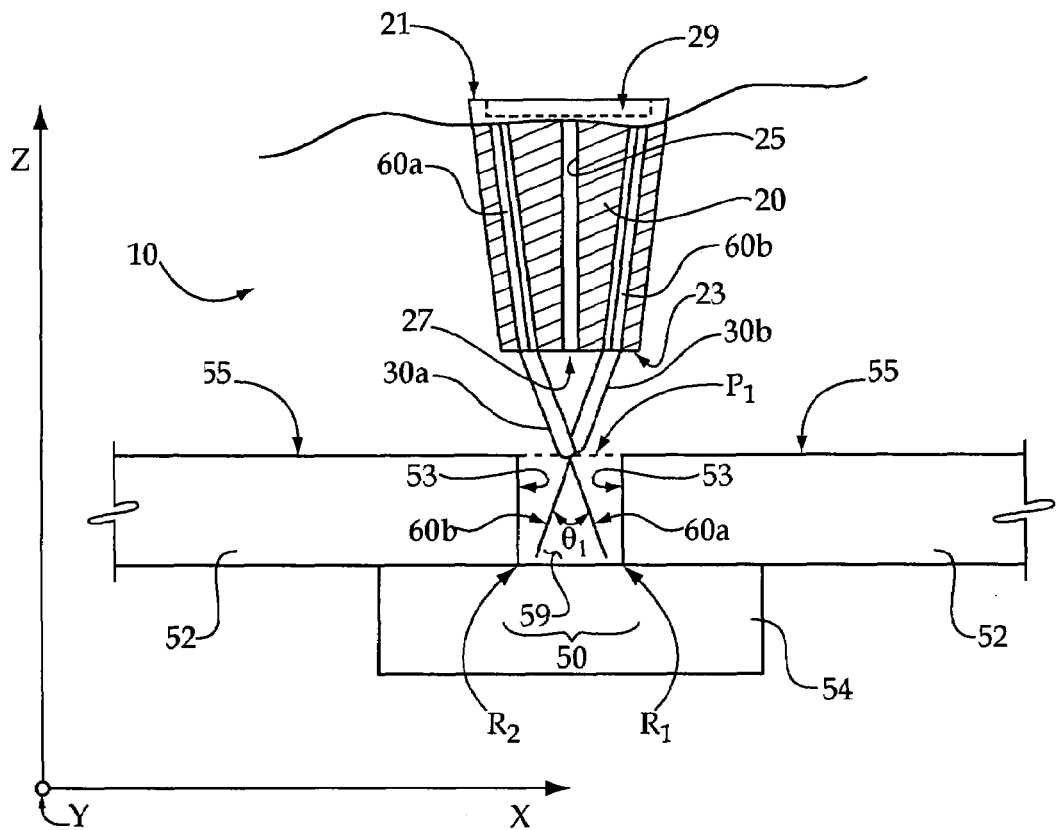
FIG. 2 is a partially sectioned front view of a portion of the welding torch assembly of FIG. 1.

Referring also to FIG. 2, illustrating a partially sectioned front view of a portion of welding torch 10, nozzle end body 20 may include an aperture 29 disposed at wire feed side 21 which is configured to allow nozzle end body 20 to be coupled with a wire feeding portion of a welding torch such as portion 12. In other embodiments, nozzle end body 20 may be coupled with different components of a welding torch and/or via different means than aperture 29. Nozzle end body 20 may also include an internal gas passage 25 having a gas outlet 27 which is configured to direct a shielding gas outwardly from welding side 23 of nozzle end body 20 for shielding purposes familiar to those skilled in the art. In certain embodiments, nozzle end body 20 may comprise a retrofit attachment for existing dual wire welding torches, aperture 29 facilitating coupling therewith. Gas passage 25 may also be configured to align with a gas supply line (not shown) when coupled with a welding torch such as torch 10. In still further embodiments, rather than a retrofit for a traditional dual wire welding torch, nozzle end body 20 may comprise an attachment that is used to render torch 10 applicable for certain types of welding such as the welding of narrow groove butt joints. In such an embodiment, torch 10 may be configured for use in other types of welding, or for welding joints other than butt joints, when nozzle end 20 is not attached thereto. It may be desirable in certain embodiments to utilize a non-conductive material in constructing nozzle end body 20 and welding wire guides 30a and 30b. To this end, nozzle end body 20 and wire guides 30a and 30b may be constructed from a non-conductive ceramic material, for example.

It is contemplated that nozzle end body 20 and its respective components may be configured to re-orient a first and a second welding wire 60a and 60b from coplanar and converging orientations, for example, defined by wire feeding portion 12, to non-coplanar and divergent orientations via welding wire guides 30a and 30b, for reasons which will be apparent from the following description. Thus, rather than relying upon magnetic fields or some other means to orient wires 60a and 60b, torch 10 is able to orient the wires as desired via guides 30a and 30b. As described herein, the term "non-coplanar" should be understood to mean that the orientations of welding wires 60a and 60b, and welding wire guides 30a and 30b, do not lie entirely in a common plane, as is typically the case with traditional dual wire welding torches.

The term "divergent," in reference to the orientations of welding wires 60a and 60b should be understood to mean that they extend generally away from one another in a direction away from nozzle end 20. In other words, the distance separating wires 60a and 60b is greatest at their tips 61, identified in FIG. 4a. The term "divergent," as used herein, should nevertheless not be understood to foreclose designs having welding wires which approach one another along a portion of their lengths, so long as the line segments defined by welding wires 60a and 60b in fact become farther apart in a direction toward tips 61 of wires 60a and 60b, apart from any portions of the respective line segments which approach one another. In other words, designs are contemplated herein wherein welding wires might initially extend initially generally toward one another, but ultimately diverge in a direction toward their tips. The described non-coplanar and divergent relationship facilitates a desired positioning and maneuvering of wires 60a and 60b during welding, as described herein. Although wire size may vary based on the application, suitable welding wires may be about 0.045 inches in diameter, for example.

In FIG. 2, torch 10 is shown positioned in the proximity of a joint such as a butt joint 50 between adjacent workpiece members 52. Each of workpiece members 52 may include an edge surface 53, for example, a planar edge surface, which faces and in part defines a channel 59. A backing plate 54 may be positioned across one side of channel 59 and may comprise a planar member defining one side thereof. The thickness of backing plate 54 relative to workpiece members 52 may vary from being relatively thin to as thick, or possibly even thicker, than workpiece members 52 in some embodiments. A top plane $P_1$ may, together with facing edge surfaces 53 and backing plate 54, define channel 59. Top plane $P_1$ comprises an imaginary plane that includes therein lines defined by intersections of edge surfaces 53 with top surfaces 55 of each of workpiece members 52.

While channel 59 is illustrated in the context of a parallel walled channel, the present disclosure is not thereby limited. One advantage of the present disclosure resides in the ability of torch 10 to weld an acceptable or superior joint such as a butt joint between adjacent workpiece members 52 without first beveling or otherwise modifying edge surfaces 53 to allow welding wires 60a and 60b to be appropriately positioned and maneuvered within joint 55. In particular, because welding wires 60a and 60b will typically diverge from one another both fore and aft and side to side in channel 59, they can be located at optimal positions for welding without their respective arcs interfering with one another, and without wires 60a and 60b unduly moving about due to magnetic and mechanical forces thereon. It should be appreciated, however, that torch 10 need not be used within a parallel walled channel or even within a channel at all, and torch 10 is contemplated to be suitable and may even be superior to conventional welding torches when welding other types of joints. Moreover, as described above, nozzle end body 20 may be used as an accessory to facilitate welding certain joints, and removed for welding others.

Figure 2A:
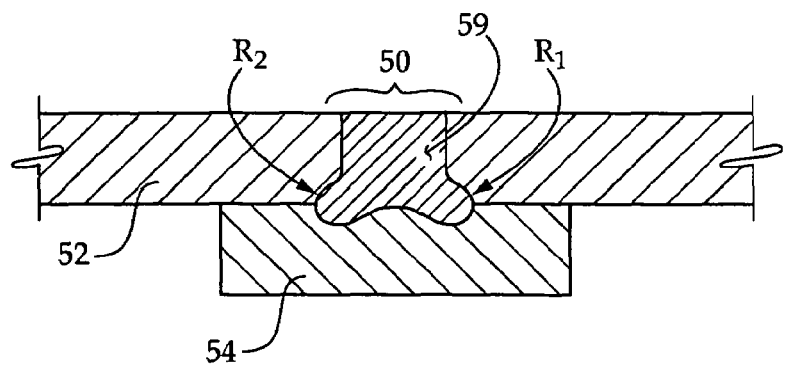
FIG. 2a is a cross section through a joint welded according to one embodiment.

Returning to the context of the butt joint 50 shown in FIG. 2, first and second welding wires 60a and 60b may be positioned by first and second wire guides 30a and 30b in first and second welding wire orientations, respectively. As further described herein, the prescribed positioning of first and second welding wires 60a and 60b orients welding wires 60a and 60b such that they can weld a first joint root $R_1$ and a second joint root $R_2$, respectively. FIG. 2a illustrates a cross section of joint 50 with roots $R_1$ and $R_2$ welded. It will be noted that welding filler material may substantially fill channel 59, and provides a relatively uniform fill fusing roots $R_1$ and $R_2$ via melting of backing plate 54 and workpiece members 52. Many conventional welding strategies result in non-uniformity and voids in the regions which are shown as fully fused in FIG. 2a. Such non-uniformity, voids, etc. may be weak points from which cracks in a welded joint propagate, ultimately leading to structural failures, or at least requiring repair work. The orientations of wire guides 30a and 30b, and the resultant orientations of wires 60a and 60b, allow tips 61 of the respective wires to reach the joint roots of an unbeveled joint for welding in a manner not possible, or at least not practicable, with earlier designs. In certain embodiments, tips 61 may be positioned within about 15 millimeters, and in still other embodiments within about 10 millimeters, of roots $R_1$ and $R_2$. Joint 50 may be a joint less than about 35 millimeters in diameter, and in some embodiments may be less than about 20 millimeters in diameter.

Also shown in FIG. 2 are three spatial dimensions via X, Y and Z-axes. The Y-axis illustrated in FIG. 2 is oriented generally parallel a direction that torch 10 is moved during welding, although the present disclosure is not thereby limited. The front view of torch 10 in FIG. 2 illustrates a projection angle $\theta_1$ defined by the orientations of first and second wires 60a and 60b, the angle lying in a plane that intersects each of the Z-axis and X-axis and is perpendicular to the Y-axis. In other words, if the orientations of wires 60a and 60b are projected in a plane that intersects the X-axis and the Z-axis, the projections may be understood as being disposed at an angle relative to one another, the angle being about 6.0°, for example about 6.4°, in certain embodiments. In other embodiments, the angle $\theta_1$ may be in a range of about 4.0° to about 11.0°, and may also be in a range of about 6.0° to about 9.0°, or within another range. To provide the desired angular relationship between welding wires 60a and 60b, wire guides 30a and 30b are similarly oriented in a divergent and non-coplanar relationship.

It should be appreciated that the angle $\theta_1$ may be selected on the basis of a number of factors. Where wires 60a and 60b are disposed at a relatively lesser angle $\theta_1$, they may be oriented relatively closer to a parallel relationship with edge surfaces 53. As such, the tendency for the electrical arcs associated therewith to extend to edge surfaces 53, rather than roots $R_1$ and $R_2$, may be greater. It is generally undesirable for the respective electrical arcs to contact walls of joint 50 as they will weld edge surfaces 53 rather than roots $R_1$ and $R_2$ and, hence, some angling between wires 60a and 60b is desirable to ensure that roots $R_1$ and $R_2$ are properly fused by appropriately oriented electrical arcs. In addition, angling of wires 60a and 60b, as opposed to being parallel one another, will tend to be desirable to facilitate exiting of spatter that results from the welding process.

Separation of wires 60a and 60b also avoids magnetically induced interference between the arcs and the wires, which can lead to loss of control over positioning wires 60a and 60b and thus the overall welding process. The joint geometry, wire length and torch size may also affect how large angle $\theta_1$ may be, although it is contemplated that $\theta_1$ may be relatively larger for relatively wider joints, up to a point at which the size or uniformity of the molten pool is compromised, and dual wire welding becomes less practicable. Those skilled in the art will readily recognize the limitations associated with molten pool size and uniformity. The presently described range for $\theta_1$ provides a compromise given the foregoing factors, that is contemplated to be suitable for welding a variety of joints, although the present disclosure is not thereby limited. The angle $\theta_1$ corresponds to the "side-to-side" divergence of wires 60a and 60b described above.

Figure 3:
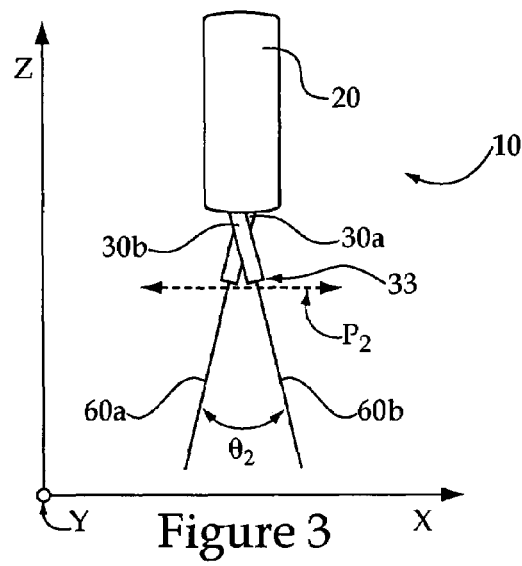
FIG. 3 is a side view of a portion of a welding torch assembly similar to that shown in FIG. 2.

Turning to FIG. 3, there is shown a portion of torch 10 viewed from a direction aligned approximately along the X-axis. FIG. 3 illustrates a second projection angle $\theta_2$ between the respective welding wire orientations of wires 60a and 60b, defined by wire guides 30a and 30b. The second projection angle $\theta_2$ may be about 9.0°, for example, defined by orientations of wires 60a and 60b projected in a plane intersecting the Z-axis and the Y-axis, in certain embodiments. In other embodiments $\theta_2$ may be in a range of about 4.0° to 11.0° and may further be in a range of about 6.0° to about 9.0°, or another range. The second projection angle $\theta_2$ corresponds to the "fore and aft" divergence of wires 60a and 60b described above.

The second projection angle $\theta_2$ may also be determined on the basis of several factors. As discussed with regard to angle θ₁, some angling of wires 60a and 60b may be desirable to assist in allowing spatter to exit, θ₂ being generally, but not necessarily, the more important angle in this regard. In addition, the size of the molten pool formed during welding may bear on the selected angle θ₂. If the molten pool is too large, the welding process may be taking place at less than optimal efficiency, as heat from the welding arcs may be more spread out, resulting in greater total heat into the workpiece, and more energy required to properly fuse roots R₁ and R₂. Another problem relates to a "ripple" which may form in the molten pool between the respective arcs. This ripple is often larger as the arcs become more spread out, as would tend to occur with a larger angle θ₂. Thus, pool size or length within the subject joint, and undue ripple size, which can result in submerging one of the arcs, represent concerns tending to be associated with a relatively larger angle θ₂. As with the transverse angle θ₁, however, wires 60a and 60b should not be positioned too close together due to magnetic interference issues. The disclosed ranges for angle θ₂ thus also represent a balance of varying concerns.

Earlier welding strategies were unable to properly position and orient welding wires with respect to a joint, due at least in part to the foregoing concerns, without first modifying the joint components to facilitate maneuvering of the wires. The presently disclosed method and apparatuses thus address concerns recognized, but heretofore unsolved, in the art. In conjunction with the side to side divergence of wires 60a and 60b, their fore and aft divergence allows the wires to be optimally positioned in three-dimensional space in a manner not taught or recognized in earlier designs such as Stava, discussed above. Positioning wires 60a and 60b as described herein provides for a molten pool of optimal size, minimal risk of magnetically induced interference between the wires and/or arcs, and minimal risk of the respective arcs departing from their intended positions relative to roots R₁ and R₂. These advantageous characteristics are all possible via the presently disclosed design in welding a relatively narrow joint, such as butt joint 50, without first modifying the respective components of the joint, and without using a fragile and/or unwieldy welding torch.

Figure 4A:
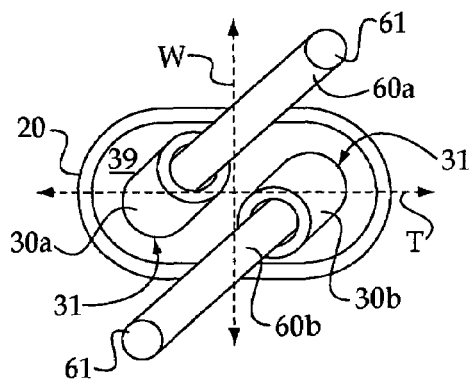
FIG. 4a is a end view of a welding torch nozzle end body according to one embodiment.

In view of the illustrated projection angles θ₁ and θ₂, wires 60a and 60b may also be understood as being angled away from one another in a welding direction, fore and aft divergence, as well as being angled away from one another relative to a direction transverse to a welding direction, side to side divergence, as further described and illustrated herein. The orientations of wires 60a and 60b are defined at least in part by the orientations of wire guides 30a and 30b. Referring also to FIG. 4a, there is shown an end view of nozzle end body 20 with welding wires 60a and 60b extending from wire guides 30a and 30b, respectively. Wire guides 30a and 30b define a welding travel plane W shown edge-on in FIG. 4a. Welding travel plane W will generally extend longitudinally along a center of channel 59 and be oriented parallel edge surfaces 53 in the context of butt joint 50, depending upon the positioning of torch 10.

Wire guides 30a and 30b also define another plane T which is transverse, and may be normal, to welding travel plane W and intersects proximal ends 31 of wire guides 30a and 30b. As illustrated in FIG. 4a, each of planes T and W may be thought of as being oriented normal to an end surface 39 of nozzle end body 20. Wire guides 30a and 30b also define yet another plane P₂ which intersects distal ends 33, illustrated edge-on in FIG. 3 and is oriented transverse to planes T and W, for example, being oriented normal to planes T and W.

In the illustrated embodiment, the first projection angle, θ₁, thus lies in transverse plane T, whereas the second projection angle, θ₂, lies in welding travel plane W. The orientations of wires guides 30a and 30b may be such that they each define angles relative to transverse plane T of about 2.0° to about 6.0°, and relative to welding travel plane W of about 2.0° to about 6.0°. It should be appreciated that the described angles are illustrative only, and alterations to the disclosed design for torch 10 might be made which would alter the relative positioning of the various planes, magnitude of the described angles, etc. without removing a welding torch design from the full and fair scope of the present disclosure.

It will be noted that wire guides 30a and 30b diverge from plane T in different directions, and that welding wires 60a and 60b also diverge from plane T in respective different directions corresponding with the orientations of wire guides 30a and 30b. It may be further noted that each of wire guides 30a and 30b includes at least a portion that is angled toward welding travel plane W. Depending upon the relative length and positioning of wire guides 30a and 30b, they might each be entirely angled toward welding travel plane W without intersecting it. Wire guides 30a and 30b may further be oriented in parallel planes, but need not be. In other embodiments, wire guides 30a and 30b may be in non-parallel planes, or might intersect welding travel plane W and thus include portions angled toward, and other portions angled away from, welding travel plane W. It should still further be appreciated that welding travel plane W and transverse plane T are described herein for illustrative purposes, and torch 10 might be moved in a direction aligned with plane T rather than plane W, or yet another direction, without departing from the scope of the present disclosure.

In certain embodiments, tips 61 of welding wires 60a and 60b may be disposed equidistantly from welding travel plane W, and may also be disposed equidistantly from transverse plane T. Distal ends 33 of wire guides 30a and 30b may also be disposed equidistantly from one or both of planes T and W. Proximal ends 31 may be disposed equidistantly from plane W. The present disclosure is not thereby limited, however, and where wire guides 30a and 30b have different lengths or relative orientations, planes T and W might not be positioned equidistantly from the various described features. As alluded to above, welding wire guides 30a and 30b may be oriented such that they are angled toward welding travel plane T. They may further be configured to orient welding wires 60a and 60b such that the closest point between wires 60a and 60b lies at a position between proximal ends 31 of wires guides 30a and 30b and their tips 61. Welding wire guides 30a and 30b may be oriented in a non-coplanar and divergent manner such that the closest points between wire guides 30a and 30b is at proximal ends 31, at distal ends 33, or at positions on wire guides 30a and 30b between proximal ends 31 and distal ends 33.

Figure 4B:
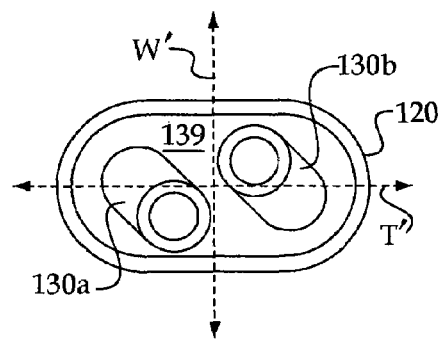
FIG. 4b is an end view of a welding torch nozzle end body according to one embodiment.

Turning to FIG. 4b, there is shown an alternative embodiment of a nozzle end body 120 according to the present disclosure. Nozzle end body 120 includes first and second welding wire guides 130a and 130b which define a welding travel plane W' and a transverse plane T', similar to nozzle end body 20 of FIGS. 1-4a. Nozzle end body 120 differs from the other illustrated embodiments, however, in that wire guides 130a and 130b extend from nozzle end body 120 in a generally counterclockwise fashion rather than a clockwise fashion as in nozzle end body 20. From the point of view of nozzle end body 120 illustrated in FIG. 4b, the left wire guide 130a extends away from a nozzle body end surface 139 downward and rightward, whereas the right wire guide extends away from end surface 139 upward and leftward. It will be noted that this configuration is approximately the reverse of nozzle end body 20.

In alternative embodiments, welding wire guides 30a, 30b and 130a, 130b might each be re-oriented approximately 180° from their illustrated configurations in FIGS. 4a and 4b, respectively, without departing from the scope of the present disclosure. In such embodiments, the respective wire guides 30a, 30b and 130a, 130b would all be divergent from planes W, T, and W', T', respectively, and would have their closest points at their proximal ends. It is contemplated, however, that embodiments wherein the respective wire guides 30a, 30b and 130a, 130b include at least portions oriented toward one of planes W, T and W', T', respectively, will represent practical implementation strategies.

Figure 5:
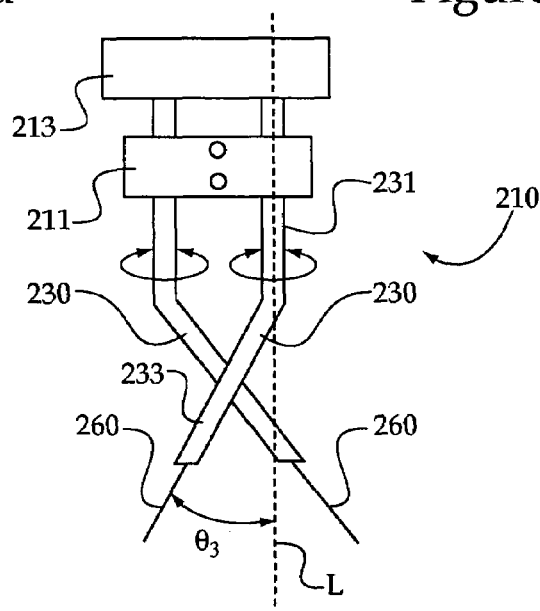
FIG. 5 is a front view of a portion of a welding torch according to yet another embodiment.

Turning to FIG. 5, there is shown a portion of a welding torch 210 having welding wire guides 230, at least one of which is adjustable to orient welding wires 260 in a plurality of different non-coplanar and divergent relationships. One or both of wire guides 230 may be rotatable relative to a welding torch main body 213 to position the corresponding welding wire 260 at an infinite number of angular orientations about a line L passing through a proximal portion 231 of the respective wire guide 230. One or both of wire guides 230 may include a distal portion 233 disposed at an angle relative to proximal portions 231. Consequently, rotation of the respective wire guide 230 can move the corresponding welding wire 260 about a path defining a cone with sides oriented at an angle relative to line L, for example, an angle $\theta_3$ of about 20°. A clamp 211 may be provided for securing wire guides 230 in a desired orientation. In other embodiments, one or both of wire guides 230 may be adjustable via some other means such as a ball and cone joint, however, all contemplated embodiments will be configured such that welding wires 260 may be oriented in a non-coplanar and divergent relationship, or a plurality of different non-coplanar and divergent relationships, if desired. Embodiments are also contemplated wherein wire guides 230 are configured to position wires 260 in a coplanar and/or convergent relationship when desired for certain types of welding, but adjustable from the coplanar and/or convergent relationship when desired, for other types of welding.

It should be appreciated that joint geometry and dimensions will affect the optimum positioning of welding wires and, hence, wires 260 may be positioned at varying orientations in torch 210 to allow optimum wire orientations to be determined for a particular joint or welding type. Although it is contemplated that torch 210 will be well suited to such research purposes, it is not thereby limited and might also be used in a production environment.

INDUSTRIAL APPLICABILITY

Referring to FIGS. 1-4a, prior to a welding operation to join workpiece members 52, channel 59 may be prepared by aligning facing edge surfaces 53, and positioning backing plate 54 appropriately such that it extends across channel 59. Backing plate 54 may be temporarily secured in position via a plurality of spot welds, for example. Torch 10 may then be positioned such that tips 61 of welding wires 60a and 60b are within channel 59 and oriented toward roots $R_1$ and $R_2$. Electrical energy may then be supplied to each of wires 60a and 60b such that an electrical arc extends from tips 61 to initiate welding at roots $R_1$ and $R_2$ and torch 10 moved along joint 50 in a direction aligned with welding travel plane W to simultaneously weld roots $R_1$ and $R_2$. Torch 10 may be moved via a robot (not shown) along joint 50 at a travel speed of about 40 centimeters per minute to about 90 centimeters per minute, for example about 50 centimeters per minute, depending upon the application. In other embodiments, torch 10 may be moved at a different rate, and it might be manually moved and controlled rather than robotically. Electrical energy may be supplied to welding wires 60a and 60b via a computer-controlled pulsed waveform having synchronized signals to wires 60a and 60b, for example. Arc corrections ranging from about 15% to about 20%, and potentially up to about 30%, may be implemented during welding. Fronius USA, of Brighton, Mich. represents one suitable commercial source of welding controllers for use in the context of the present disclosure.

During welding, a shielding gas may be supplied via gas passage 25 in a manner familiar to those skilled in the welding arts. By allowing torch 10 to be positioned relatively closer to joint 50, with wires 60a and 60b and their tips 61 extending therein, the present disclosure will allow shielding gas to be more effectively directed into joint 50 such that in some embodiments a relatively lesser amount of gas and/or less electrical energy is required as compared to traditional approaches. In addition, shielding gas may be relatively more effective due to the more confined geometry of joint 50 as compared to beveled joints, its use being reduced by up to at least about 30% in certain embodiments. Wires 60a and 60b may be fed through nozzle end body 20 and wire guides 30a and 30b to maintain tips 61 within channel 50 at desired locations relative to roots $R_1$ and $R_2$ as the welding process consumes wires 60a and 60b. A suitable wire feed rate may be about eight meters per minute, plus or minus about three meters per minute.

Operation of a torch utilizing nozzle end body 120 of FIG. 4b may take place in a manner similar to that described with respect to torch 10. With regard to torch 210 of FIG. 5, welding of a joint such as joint 50 may also be similar to that described with regard to torch 10, albeit with welding wire guides 230 secured in a selected orientation prior to beginning welding.

The present disclosure provides a welding strategy and apparatus wherein higher joint completion rates and sounder joints will be attainable than with many earlier systems. Torch 10, and other welding torches contemplated herein, provide a better reach and maneuverability of the welding wires than was possible with earlier designs, allowing the electrical arcs to be directed appropriately to better assure fusion of roots $R_1$ and $R_2$. Thick butt-jointed components previously needing prefabrication treatments may also be welded relatively rapidly and reliably without first specially preparing the joint to allow the welding wires to reach the roots, reducing production time and reducing material waste.

Although some earlier systems recognize that non-parallel dual welding wires can have certain advantages, an approach wherein welding wires are oriented in a divergent and non-coplanar relationship to improve access to the joint roots as described herein is heretofore unknown in the welding arts. The present disclosure also provides a more robust design, and improves over earlier strategies reliant upon expensive and fragile equipment, certain of which sought to attain a sound joint via relatively complex oscillation of the welding wires or other components of a welding torch. Further still, heat input across a joint's cross section will be more uniform, as wires 60a and 60b are maintained in the same orientation relative to joint 50 as they are passed along channel 59, resulting in less heat distortion of the weld.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while the present description is focused largely on consumable dual wire torches, in other embodiments, non-consumable welding wires might be used. Similarly, additional filler materials might be supplied during welding, or placed in the joint to be welded prior to welding. Other aspects, features and advantages will be apparent upon an examination of the attached drawings and appended claims.

What is claimed is:

1. A method of welding comprising:
   moving a welding torch in a welding direction with respect to a workpiece joint to be welded;
   during moving the welding torch, feeding a first welding wire through a first welding wire guide having a proximal end coupled with a nozzle end body of the welding torch and a distal end, the first welding wire guide defining a first welding wire orientation, and feeding a second welding wire through a second welding wire guide also having a proximal end coupled with the nozzle end body of the welding torch and a distal end, the second welding wire guide defining a second welding wire orientation that is divergent and non-coplanar with respect to the first welding wire orientation; and
   wherein feeding the first welding wire and feeding the second welding wire each further include feeding the welding wires through the corresponding welding wire guides from the nozzle end body of the welding torch toward at least one of, a welding travel plane aligned with the welding direction and intersecting a point on the nozzle end body located between the proximal ends of the first and second welding wire guides, and a second plane which is normal to the welding travel plane and also intersects a point on the nozzle end body located between the proximal ends of the first and second welding wire guides.

2. The method of claim 1 further comprising orienting the first welding wire via the first welding wire guide toward a first root of the joint, and orienting the second welding wire via the second welding wire guide toward a second root of the joint.

3. The method of claim 2 further comprising preparing a channel at the joint that is defined at least in part by adjacent workpiece members to be joined via welding, and moving tips of the first and second welding wires within the channel during moving the tandem welding torch.

4. The method of claim 3 wherein preparing a channel comprises preparing a parallel walled channel defined in part by facing edge surfaces of the workpiece members, in part by a backing plate extending across the channel and abutting the workpiece members at the first and second roots of the joint, and in part by a top plane opposite the backing plate and defined by an intersection of the facing edge surfaces with top surfaces of the adjacent workpiece members.

5. The method of claim 4 wherein the first and second wire guides of the tandem welding torch each comprise a proximal end coupled with a nozzle end body of the tandem welding torch and a distal end, the method further comprising orienting the first and second wire guides such that their closest point is at a position between the proximal and distal ends.

6. The method of claim 4 further comprising welding a butt joint between the first and second workpiece members, including welding the first and second joint roots during moving the tips of the welding wires within the channel.

7. The method of claim 6 further comprising coupling a nozzle end body having the first and second welding wire guides thereon with a wire feed apparatus for a tandem welding torch prior to welding a butt joint, including reorienting the first and second welding wires from a coplanar orientation defined by the wire feed apparatus via the first and second welding wire guides.

8. A nozzle end for a welding torch assembly comprising:
   a nozzle end body;
   a first welding wire guide coupled to said nozzle end body and having an orientation; and
   a second welding wire guide coupled to said nozzle end body and having an orientation different from the orientation of said first welding wire guide;
   wherein each of said first and second welding wire guides includes a proximal end coupled to said nozzle end body, and a distal end, said first and second welding wire guides further defining a first plane intersecting the distal ends thereof, a second plane intersecting each of said proximal ends and oriented transverse to said first planes and a third plane which is normal to the first plane and normal to the second plane, each of the second and third planes intersecting a point on the nozzle end body located between the proximal ends of the first and second welding wire guides, and wherein the orientations of said first and second welding wire guides are divergent in different directions from said second plane, and each of the welding wire guides further includes a portion which is angled away from the nozzle end body and toward the third plane.

9. The nozzle end of claim 8 wherein said nozzle end body includes a welding side whereupon said first and second wire guides are mounted, and a wire feed side having therein an aperture configured for coupling said end body with a portion of a welding torch nozzle.

10. The nozzle end of claim 9 wherein said nozzle end body comprises a ceramic member having a gas passage and a gas outlet configured to direct a welding gas from said gas passage outwardly from the welding side of said end body.

11. The nozzle end of claim 8 wherein said first and second wire guides define a welding travel plane oriented transverse to each of said first and second planes, and wherein each of the first and second welding wire guides includes at least a portion oriented toward said welding travel plane.

12. The nozzle end of claim 11 wherein said first and second welding wire guides each define angles relative to said second plane in a range of about 2.0° to about 6.0°, and define angles relative to said welding travel plane also in the range of about 2.0° to about 6.0°.

13. The nozzle end of claim 12 wherein said first and second welding wire guides define first and second welding wire orientations, respectively, defining a first projection angle between said welding wire orientations in said welding travel plane that is in the range of about 6.0° to about 9.0°, and a second projection angle between said welding wire orientations in said second plane that is in the range of about 4.0° to about 11.0°, wherein said welding travel plane and said second plane being oriented normal to one another and normal to said first plane.

14. The nozzle end of claim 13 wherein said first projection angle is about 9.0° and said second projection angle is about 6.0°.

15. A welding torch comprising:
   a nozzle comprising a nozzle end body having a first welding wire guide configured to orient a first welding wire in a first welding wire orientation, and a second welding wire guide configured to orient a second welding wire in a second welding wire orientation that is non-coplanar and divergent with respect to said first welding wire orientation, each of the first and second welding wire guides having a proximal end coupled with the nozzle end body and a distal end;

said first and second welding wire guides further defining a first plane intersecting the distal ends thereof, a second plane intersecting each of said proximal ends and oriented transverse to said first plane, and a third plane which is normal to the first plane and normal to the second plane, each of the second and third planes intersecting a point on the nozzle end body located between the proximal ends of the first and second welding wire guides, and wherein the orientations of said first and second welding wire guides are divergent in different directions from said second plane, and each of the welding wire guides further includes a portion which is angled away from the nozzle end body and toward the third plane.

16. The welding torch of claim 15 wherein said first and second welding wire guides are fixed at first and second orientations defining said first and second welding wire orientations, respectively.

17. The welding torch of claim 16 wherein:

each of said welding wire guides includes a proximal end and a distal end;

said first and second welding wire guides defining a first plane intersecting their respective distal ends, a second plane oriented normal to said first plane and intersecting said proximal ends and a welding travel plane oriented normal to each of said first and second planes; and said first and second welding wire orientations being divergent from said second plane and defining a first projection angle between said welding wire orientations in said welding travel plane that is in the range of about 6.0° to about 9.0° and a second projection angle between said welding wire orientations in said second plane that is in the range of about 4.0° to about 11.0°.

18. The welding torch of claim 17 wherein each of said second plane and said welding travel plane is disposed equidistantly from the respective distal ends of said first and second welding wire guides.

19. The welding torch of claim 15 wherein at least one of said first and second welding wire guides is adjustable and configured to orient the first and second welding wires in a plurality of different non-coplanar and divergent relationships.

20. The welding torch of claim 19 wherein the at least one of said first and second welding wire guides is rotatable to orient the first and second welding wires in a plurality of different non-coplanar and divergent relationships.

* * * * *